United States Patent
Nakaoka et al.

(12) 
(10) Patent No.: US 6,799,860 B2
(45) Date of Patent: Oct. 5, 2004

(54) POINT LIGHT SOURCE-ORIENTED LIGHT GUIDING MEANS AND LIGHTING UNIT UTILIZING THE SAME

(75) Inventors: Yasunari Nakaoka, Kyoto (JP); Takayuki Ishihara, Kyoto (JP); Masanori Komura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 98 days.

(21) Appl. No.: 10/262,152

(22) Filed: Sep. 30, 2002

(65) Prior Publication Data

US 2003/0099117 A1 May 29, 2003

(30) Foreign Application Priority Data

Oct. 1, 2001 (JP) .......................................... 2001-305079
Oct. 11, 2001 (JP) .......................................... 2001-313489
Oct. 19, 2001 (JP) .......................................... 2001-321889

(51) Int. Cl.[7] .............................................. F21V 7/04
(52) U.S. Cl. ............................ 362/31; 362/26; 362/561
(58) Field of Search ........................... 362/31, 26, 327, 362/331, 561; 349/61, 64, 65

(56) References Cited

U.S. PATENT DOCUMENTS 6,088,074 A * 7/2000 Suzuki ......................... 349/62
6,286,970 B1 * 9/2001 Egawa et al. .................. 362/31
6,467,925 B2 * 10/2002 Egawa et al. .................. 362/31

FOREIGN PATENT DOCUMENTS

JP 2001-210124 8/2001

* cited by examiner

*Primary Examiner*—Alan Cariaso
*Assistant Examiner*—Ali Alavi
(74) *Attorney, Agent, or Firm*—Merchant & Gould P.C.

(57) ABSTRACT

A lighting unit for illuminating a liquid crystal panel includes a point light source and a light guide. The light guide includes a first side surface extending in a direction x and having a light incidence portion facing the light source, a second side surface extending in a direction y perpendicular to the direction x, a third side surface spaced from the second side surface in the direction x, and an outlet surface for exit of light. The second side face is formed with a plurality of recesses each including a slant surface for causing light emitted from the light source to be reflected toward the third side surface. The recesses progressively increase in depth as they are positioned farther from the light source.

13 Claims, 14 Drawing Sheets

POINT LIGHT SOURCE-ORIENTED LIGHT GUIDING MEANS AND LIGHTING UNIT UTILIZING THE SAME

BACKGROUND OF THE INVENTION

1. Field of the Invention

The present invention relates to a lighting unit suitable for illuminating a liquid crystal panel. More particularly the present invention relates to a light guide utilized in such a lighting unit.

2. Description of the Related Art

An example of a conventional liquid crystal display of front-lighting type is shown in FIGS. 14A and 14B. The illustrated liquid crystal display includes a point light source 7, a liquid crystal panel 8 and a transparent light guide 9 arranged in front of the liquid crystal panel 8. The liquid crystal display is of reflection type, provided with a reflector 80 at the back of the panel 8.

The light guide 9 has a nonflat front surface 90a and a flat rear surface 90b. The front surface 90a is formed with a plurality of projections 91. Each projection 91 includes two inclined surfaces 91a and 91b extending at different inclination angles. The rear surface 90b faces the liquid crystal panel 8. The light guide also includes first~third side surfaces 90c~90e extending between the front surface 90a and the rear surface 90b. The first side surface 90c is provided with a light incidence surface 92 facing the light source 7. The second side surface 90d is formed with a plurality of V-shaped recesses 93, and each recess i3 has paired surfaces 93a. The third side surface 90e is flat and disposed opposite to the second side surface 90d.

With the above-described arrangement, light emitted from the light source 7 enters into the light guide 9 via the light incidence surface 92. Then, part of the light travels toward the second side surface 90d to be reflected on the wall surface 93a of the recess 93, and directed to the third side surface 90e. Then, the light is partially reflected toward the liquid crystal panel 8 by the inclined surface 91a of the recess 91, and emitted outside via the rear surface 90b of the light guide 9. The liquid crystal panel 8 is illuminated with the emitted light.

In the conventional liquid crystal display, the light guide 9 is used in the hope of achieving uniform illumination of the LC display 8 with the light originating from the point light source 7. However, since the recesses 93 of the conventional light guide 9 are identical in shape and size, the following problems arise.

Referring to FIG. 14B, with the conventional arrangement, the respective recesses 93 receive different amounts of light from the light source 7 due to the different distance from the light source. More specifically, a recess positioned relatively close to the light source 7 receives more light than a recess positioned relatively far. In addition, since all the recesses 93 are the same in shape and size, as described above, the wall surfaces 93a of the respective recesses 93 will reflect different amounts of light toward the side surface 90e. Thus, the light is emitted from the rear surface 90b of the light guide 9 with uneven intensity. Such nonuniform light is not preferable for illuminating the LC panel 8 since the quality of an image produced by the panel 8 deteriorates.

Further, as shown in FIG. 14B, in the conventional liquid crystal display, the light beams reflected by the wall surfaces 93a of the recesses 93 tend to be nonparallel to each other. This is because the irradiation angles of the light beams differ depending on whether a recess is located close to or apart from the light source 7. Such nonparallel beams are also responsible for the uneven light emission from the light guide 9.

SUMMARY OF THE INVENTION

The present invention has been proposed under the circumstances described above. It is, therefore, an object of the present invention to provide a lighting device designed to uniformly illuminate an object such as a LC panel with the use of a point light source.

According to a first aspect of the present invention, there is provided a lighting unit comprising: a light source; and a light guide that includes a first side surface extending in a direction x and having a light incidence surface facing the light source, a second side surface extending in a direction y perpendicular to the direction x, a third side surface spaced from the second side surface in the direction x, and an outlet surface for exit of light. The second side surface is formed with a plurality of recesses each including an inclined surface for causing light emitted from the light source to be reflected toward the third side surface, the recesses increasing progressively in depth as they are positioned farther from the light source.

Preferably, the inclined surface of each recess forms an acute angle relative to the direction y, the angle increasing progressively as the recess is positioned farther from the light source.

Preferably, the light incidence surface inclines at an acute angle to the second side surface.

Preferably, the light source comprises a light-emitting diode chip including a light-emitting surface and inclining to the second side surface so that the light emitting surface is disposed in parallel to the light incidence surface.

According to a second aspect of the present invention, there is provided a liquid crystal display comprising: a liquid crystal panel; a light guide facing the liquid crystal panel; and a point light source arranged adjacent to the light guide. The light guide has a side surface formed with a plurality of wedge-shaped recesses that reflect light emitted from the light source, the recesses increasing progressively in depth as they are positioned farther from the light source.

According to a third aspect of the present invention, there is provided a light guide comprising: a front surface and a rear surface; a first side surface which extends in a direction x and includes an light incidence surface; a second side surface which extends in a direction y perpendicular to the direction x; a light outlet region for exit of light traveling in the direction x through either one of the front surface and the rear surface; and a light guiding region leading light cast from the light incidence surface to the light outlet region by reflection on the second side surface. The light guiding region is formed with an elongated slit extending in the direction y.

Preferably, the slit has a pair of mirror surfaces spaced apart from each other in the direction x.

Preferably, the light guiding region has a front surface and a rear surface which are covered with a light reflector.

Preferably, the light guiding region has a front surface and a rear surface which are formed with a plurality of wedge-shaped grooves extending in the direction y for reflecting light emitted from the light source.

Preferably, the second side surface is formed with a plurality of recesses each including a light reflecting surface inclining relative to the direction y.

According to a fourth aspect of the present invention, there is provided a lighting unit comprising a light guide, a light source and a light reflector. The light guide includes a front surface, a rear surface, and elongated first and second side surfaces spaced from each other. The light source emits light into the light guide so that the supplied light travels in the light guide from the first side surface toward the second side surface. The light reflector reflects light traveling from the first side surface to the second side surface within the light guide. The light guide has a surface formed with a plurality of inclined surfaces for causing the light reflected by the light reflector and traveling from the second side surface toward the first side surface to be reflected for exit through the rear surface of the light guide.

Preferably, the light reflector covers the second side surface.

Preferably, the second side surface is formed with a plurality of recesses each forming a wall surface inclining relative to a longitudinal direction of the second side surface.

Other features and advantages of the present invention will become apparent from the detailed description given below with reference to the accompanying drawings.

DETAILED DESCRIPTION OF THE PREFERRED EMBODIMENT

Preferred embodiments of the present invention will be described below with reference to the accompanying drawings.

Figure 1:
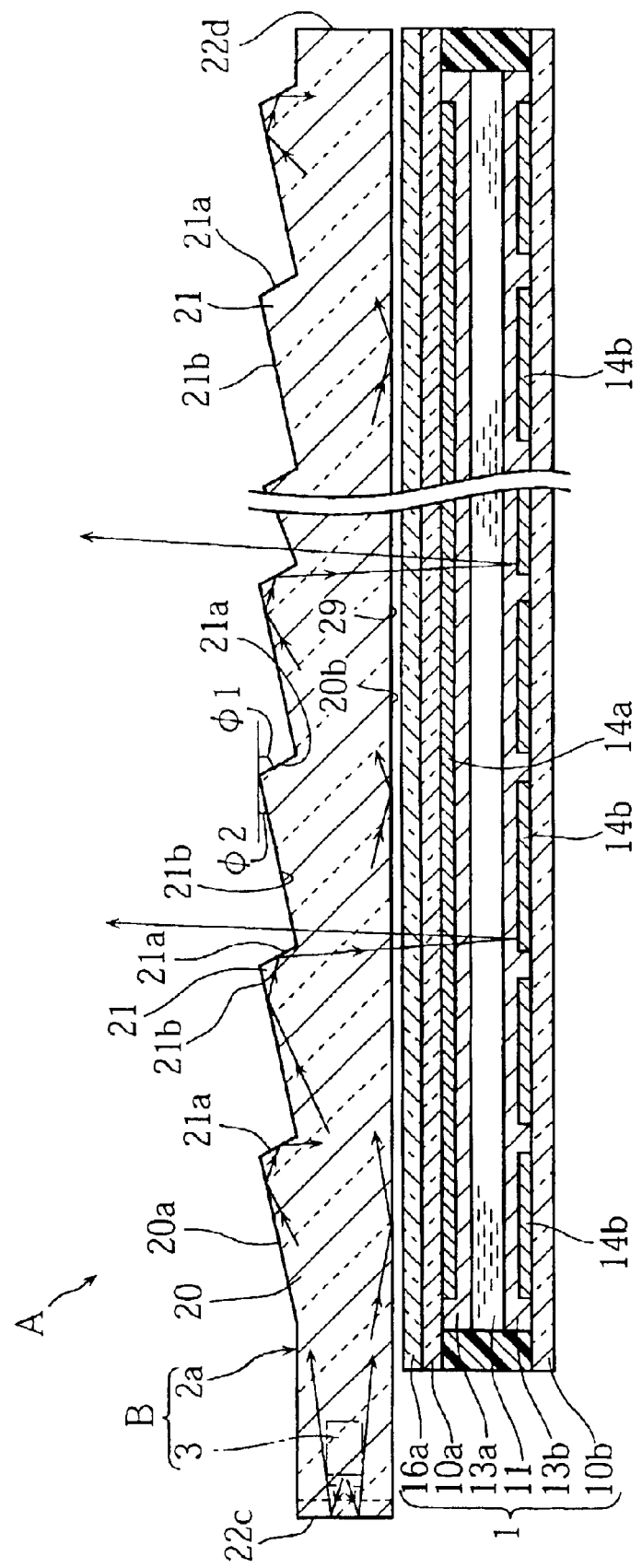
FIGS. 1–3 show the arrangements of a light guide according to a first embodiment of the present invention.
Figure 2:
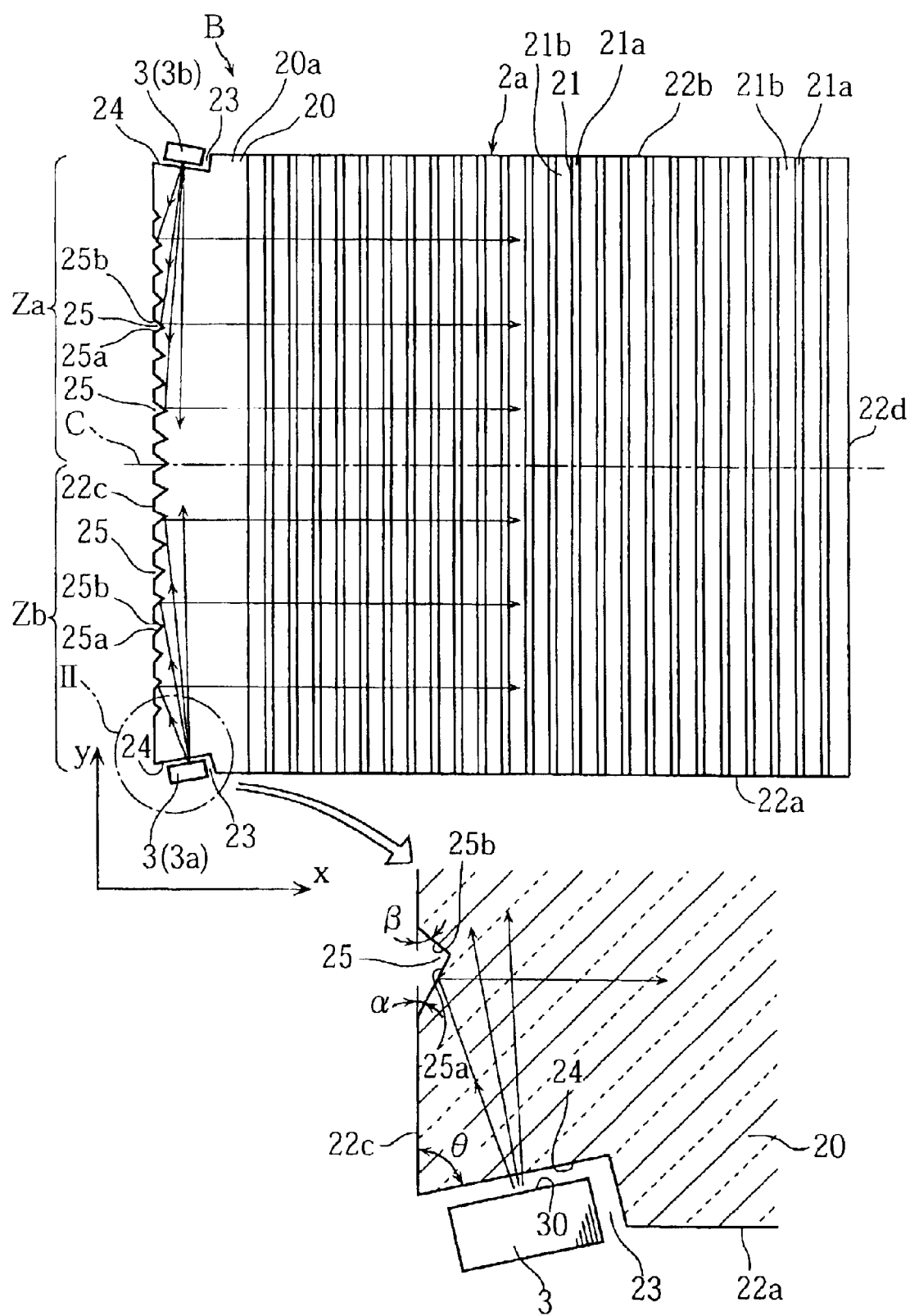
Figure 3:
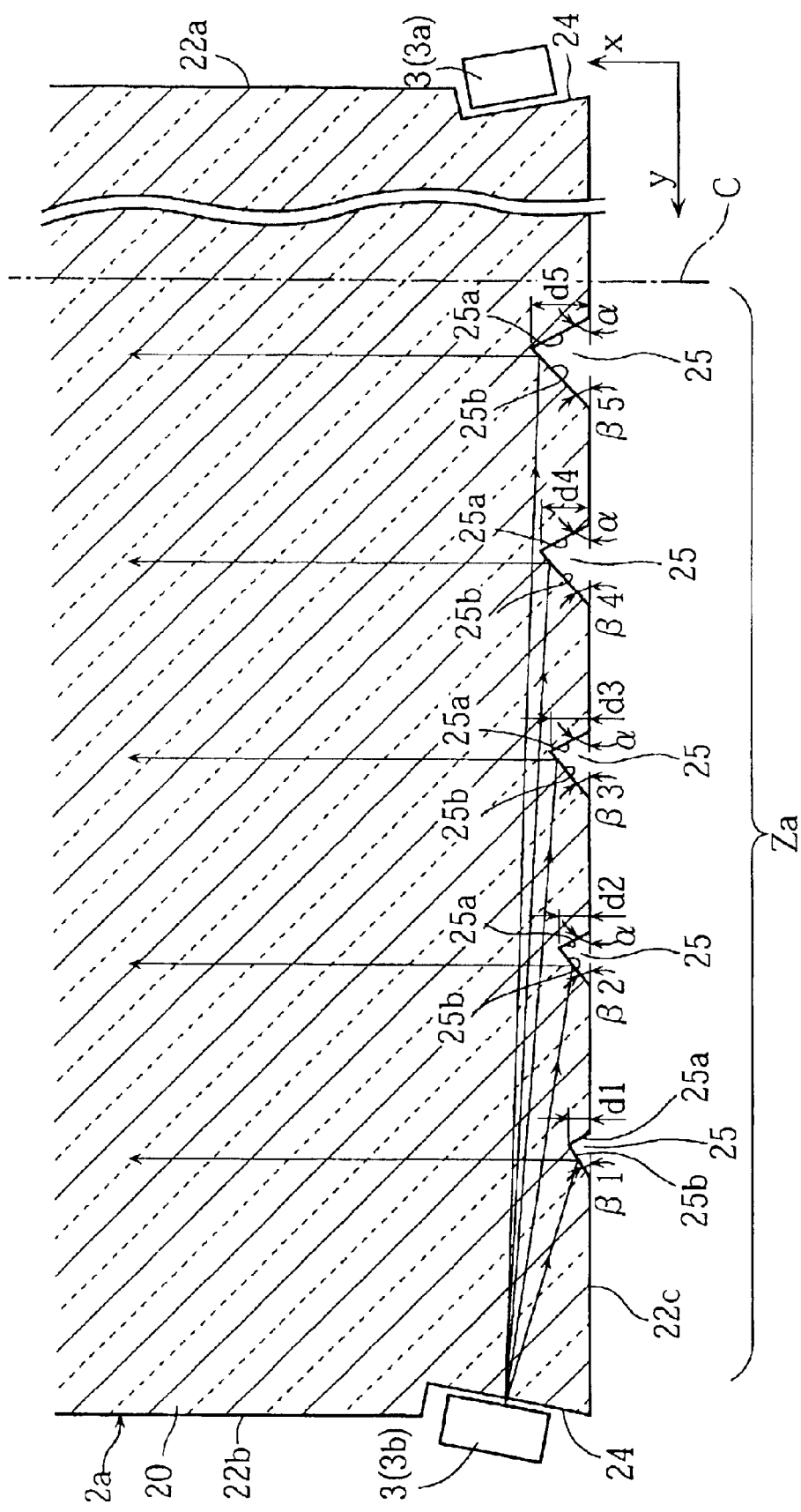

FIG. 1 illustrates the fundamental structure of a liquid crystal display A provided with a light guide in accordance with a first embodiment of the present invention. The liquid crystal display A is of reflection type, provided with a liquid crystal panel 1 and a lighting unit B disposed in front of the panel (front-lighting type). The lighting unit B includes a light guide 2a and two light sources 3. FIGS. 2 and 3 illustrate the light guide 2a in detail.

The light guide 2a of the illustrated example is a transparent plate 20 made of synthetic resin. The transparent plate 20 includes a front surface 20a and a rear surface 20b spaced apart from each other in the direction of thickness. The transparent plate 20 also includes a first side surfaces 22a and a second side surface 22b extending in a direction x in FIG. 2, and third and fourth surfaces 22c and 22d extending in a direction y (perpendicular to the direction x). These surfaces of the transparent plate 20 are smooth (specular) surfaces that can totally reflect light.

The rear surface 20b of the transparent plate 20 is flat. As will be described later, most of the rear surface 20b is allotted for a light outlet region 29 which allows light to emit toward the liquid crystal panel 1. The front surface 20a of the transparent plate 20 is not flat and formed with a plurality of projections 21. As seen from FIGS. 1 and 2, each projection 21 includes first and second slant surfaces 21a and 21b extending in the direction y. The slant surfaces 21a, 21b incline at different angles ($\Phi 1 > \Phi 2$) to the rear surface 20b (FIG. 1).

The first and second slant surfaces 21a and 21b are formed to reflect light that travels from the third side surface 22c to the thud fourth side surface 22d. Specifically, the first slant surface 21a reflects the light toward the rear surface 20b, whereas the second slant surface 21b reflects the light toward the first side surface 21a. The light reflected by the first slant surface 21a penetrates the rear surface 20b of the transparent plate 20 to travel within the liquid crystal panel 1. It is apparent for those skilled in the art that the description of the behavior of light is simplified so as not to be unnecessarily accurate. For example, light may be reflected in various directions other than the above-described directions by the slant surfaces 21a, 21b. It should be appreciated that the following description about the behavior of the light is also simplified.

Referring to FIGS. 2 and 3, each of the first and second side surfaces 22a and 22b are formed with a cutout 23 adjacent to the third side surface 22c. Each cutout 23 has a light incidence surface 24 for entrance of light emitted from the light source 3 into the transparent plate 20. The light incidence surface 24 is inclined to the second side surface 22c at an acute angle θ. The angle θ may be in a range of 80–84 degrees. The light incidence surface 24 may be curved, though it is made flat in the illustrated embodiment.

As the light source 3, use may be made of a light-emitting diode (LED). To be used as a light source, the LED chip may be packaged with transparent resin or may not. The light source 3 is placed so that its light emitting surface 30 is parallel to the light incidence surface 24.

The third side surface 22c of the transparent plate 20 is formed with a plurality of recesses 25 spaced apart from each other. The recesses 25 may be arranged at regular or irregular intervals. Each recess 25 has two wall surfaces 25a and 25b crossing at a predetermined angle.

As shown in FIG. 2, the recesses 25 are divided by a central line C of the transparent plate 20 into two groups (Za, Zb). The recesses 25 of the group Za and those of the group Zb are arranged symmetrical with respect to the central line C.

The recesses 25 of the group Za will now be described. As shown in FIG. 3, the recesses 25 increase progressively in depth as they are positioned farther from the light source 3 (in other words, closer to the central line C of the transparent plate 20). In the embodiment of FIG. 3, five recesses 25 are formed, and their depths d1~d5 satisfy a relation d1<d2<d3<d4<d5. It should be noted that five recesses are illustrated merely by way of example and the number of the recesses is not limited to this.

Light emitted from the light source 3b is reflected by the wall surface 25b of each recess 25. The wall surfaces 25b form acute angles β1~β5 relative to the axis y so that the light from the light source 3b is totally reflected in the direction x (or a direction substantially parallel to the direction x). In the illustrated embodiment, a relation β1<β2<β3<β4<β5 holds. The specific values of the angles β1~β5 can be calculated by specifying the positions of the light sources 3b and of the respective recesses 25.

Next, the setting of the angle α of the wall surface 25a will be described. In the illustrated embodiment, the angle α (acute relative to the axis y) is the same for all the recesses 25 of the group Za. The reason is as follows. Differing from the wall surfaces 25b described above, the wall surfaces 25a receive light emitted from the light source 3a (positioned on the side of the first side surface 22a). However, since the wall surfaces 25a are positioned relatively far from the light source 3a, the light from the light source 3a is weakened. Such weak light cannot greatly contribute to the realization of uniform illumination for the liquid crystal panel 1, no matter what value the angle α of the wall surface 25a is set to. Thus, the angle α is made identical for all the recesses 25 regardless of their positions. Of course, the present invention is not limited to this, and the angles α of the respective wall surfaces 25a may differ from each other depending on the positions of the recesses 25.

As described above, the recesses 25 of the group Zb are positioned in symmetric relation to the recesses 25 of the group Za about the central line C. That is, the recesses 25 of the group Zb increase progressively in depth as they are positioned closer to the central line C. Each angle α of the wall surface 25a of the recess 25 increases progressively as it is positioned closer to the central line C, while each wall surface 25b of the recess 25 has the same angle β.

Though not illustrated in the figure, the fourth side surface 22d and the first and second side surfaces 22a, 22b (excluding the light incidence surface 24) are provided with a highly reflective light reflecting layer formed by vapor deposition of aluminum or application of white coating. This arrangement prevents the light entering into the transparent plate 20 from escaping via these parts.

The liquid crystal panel 1 has a conventionally known structure and may be made up of the following components. Referring to FIG. 1, the liquid crystal panel 1 includes a pair of glass or resin substrates 10a, 10b and a liquid crystal 11 sealed between them. The paired substrates 10a and 10b are internally provided with a plurality of electrodes 14a, 14b and alignment layers 13a and 13b. A polarizer 16a is provided in front of the substrate 10a. Simple matrix driving method (passive driving method) is employed as a driving method. The electrodes 14a are horizontal electrodes (scanning electrodes) that extend laterally in the figure and are evenly spaced in the direction perpendicular to the plane of paper. The other electrodes 14b are vertical electrodes (signal electrodes) that extend in the direction perpendicular to the plane of paper and are evenly spaced in the lateral direction of the figure. A pixel is defined at a point where one scanning electrode 14a and one signal electrode 14b cross each other. With selective application of voltage to the pixels, a desired image can be displayed. Instead of the passive driving method, an active driving method may be employed.

The substrate 10a and each electrode 14a (made of ITO film) are transparent. On the other hand, the electrodes 14b are made of metal that can reflect light. Thus, the light emitted to the liquid crystal panel 1 from the front side of the panel passes through the polarizer 16a, the substrate 10a and the liquid crystal 11, and is reflected by the electrodes 14b toward the front side of the liquid crystal panel 1.

With the above-described arrangements, the light emitted from the light sources 3a, 3b will travel through the LC display 4 in the following manner.

Referring to FIG. 2, when two light sources 3 (3a, 3b) are turned on, light emitted from each light source 3 enters into the transparent plate 20 via the light incidence surfaces 24, to travel toward the second side surface 22c. Then, the light is totally reflected by the wall surfaces 25a (group Za) or the wall surfaces 25b (group Zb) of the recesses 25.

As described above with reference to FIG. 3, the recesses 25 of the group Za increase progressively in depth (d1~d5) as they are positioned farther from the light source 3b. This enables the recesses 25 relatively far from the light source 3b to receive an appropriate amount of light from the light source 3b with the wall surfaces 25b. In this manner, it is possible to average the amount of light received or reflected by the wall surfaces 25b among the recesses 25. Further, each wall surface 25b is formed so as to direct the light beam traveling from the light source 3b in a direction parallel to the direction x. This also holds for the recesses 25 of the group Zb.

Referring to FIG. 1, the light reflected from the third side surface 22c to the fourth side surface 22d is totally reflected on the second slant surface 21b and the rear surface 20b. Repeating the total reflection, the light can travel throughout the transparent plate 20. On the other hand, when light is totally reflected by the first slant surface 21a, it strikes on the rear surface 20b at an angle smaller than the critical angle of total reflection. Consequently, the light is emitted from the light outlet region 29 of the rear surface 20b to irradiate the liquid crystal panel 1. The light irradiating the liquid crystal panel 1 is reflected by the electrodes 14b of the panel 1 to the front side of the panel 1. Then, the light passes through the transparent plate 20 in the thickness direction. The image produced by the LC panel 1 is seen through the transparent plate 20.

As explained above with reference to FIG. 2, the light emitting surface 30 of each light source 3 is parallel to the light incidence surface 24. Thus, the light emitted from the light source 3 is scarcely reflected by the light incidence surface 24, which is advantageous to permitting an appropriate amount of light to enter into the transparent plate 20. Further, the light emitting surface 30 of the light source 3 is oriented toward the second side surface 22c at an angle to the surface 22c. With this arrangement, fluxes of light that travel in front of the light source 3 and have a high luminous density can be efficiently directed to the respective recesses 25 of the second side surface 22c.

As explained below, the above light guide 21a (the transparent plate 20) can be modified in various ways. Note that in the following description, the elements identical or similar to those of the liquid crystal display A are designated by the same reference signs.

Figure 4:
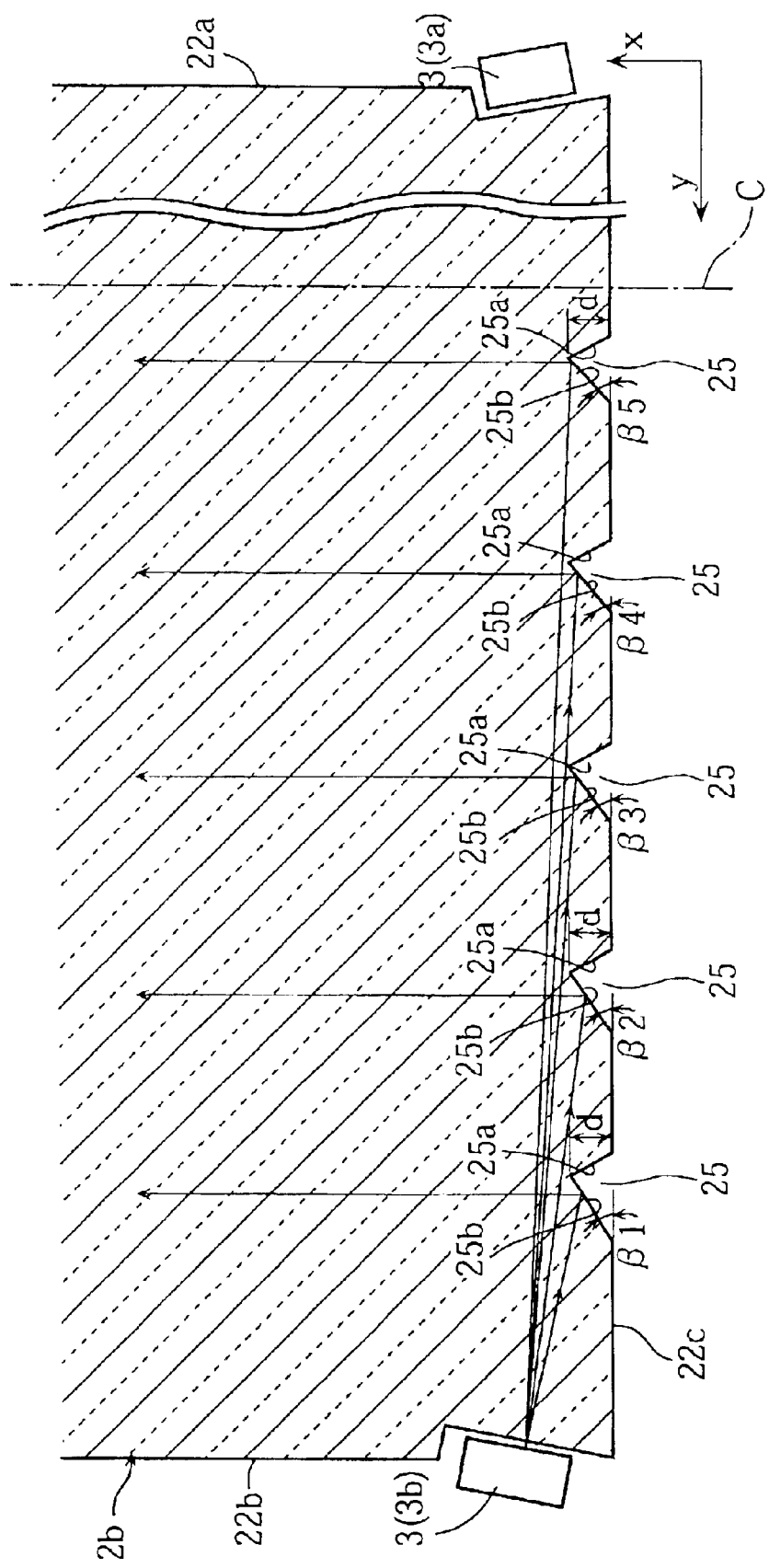
FIG. 4 shows the arrangements of a light guide according to a second embodiment of the present invention.

FIG. 4 illustrates the main portion of a light guide 2b according to a second embodiment of the present invention. Like the first embodiment, the second embodiment utilizes two point light sources 3a and 3b disposed adjacent to the first side surface 22a and the second side surface 22b of the transparent plate, respectively The third side surface 22c, extending between the side surface 22a and 22b, is formed with a plurality of recesses 25 for reflecting light from the light source in the direction x. The recesses 25 include wall surfaces 25b inclining at angles β1~β5, which increase as positioned closer to the central line C. The second embodiment differs from the first embodiment in that the recesses 25 have the same depth d. This arrangement can also cause light beams reflected by the wall surfaces 25b to travel generally parallel to each other. Consequently, by the second embodiment, the liquid crystal display is illuminated more evenly than is conventionally possible.

Figure 5:
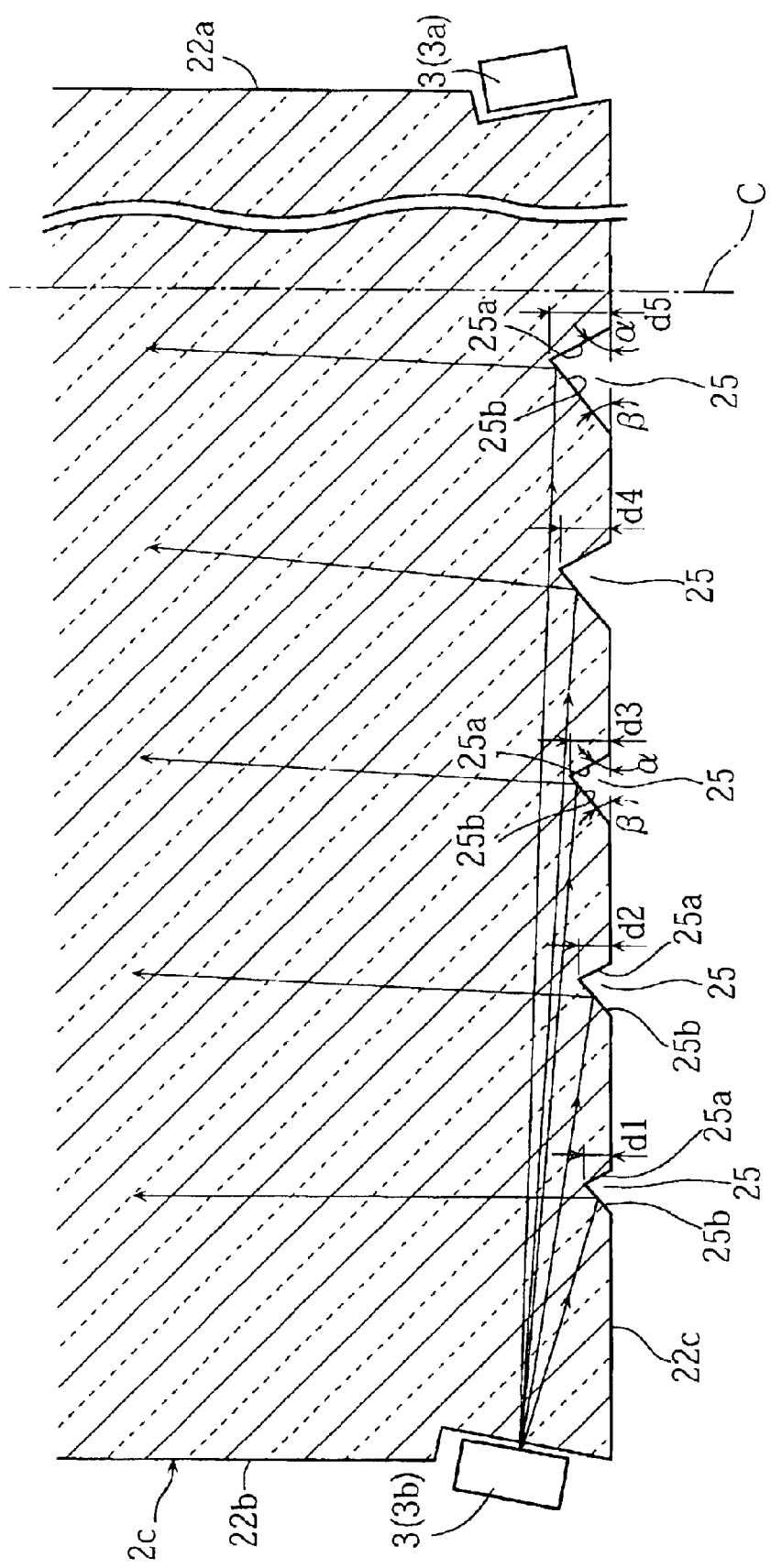
FIG. 5 shows the arrangements of a light guide according to a third embodiment of the present invention.

FIG. 5 illustrates the main portion of a light guide 2c according to a third embodiment of the present invention. As in the first embodiment, two point light sources 3a and 3b are disposed respectively adjacent to the first side surface 22a and the second side surface 22b of the transparent substrate. The third side surface 22c, extending between the side surface 22a and 22b, is formed with a plurality of recesses 25 for reflecting light from the light source. According to the third embodiment, all the recesses 25 have the same inclination angle α of the wall surface 25a and the same inclination angle β of the wall surface 25b. However, the depths d1~d5 of the recesses 25 are made different and increase as the recesses are positioned closer to the central line C. By providing recesses that differ only in depth, the irradiation of the LC panel can performed more uniformly than is conventionally possible.

Figure 6:
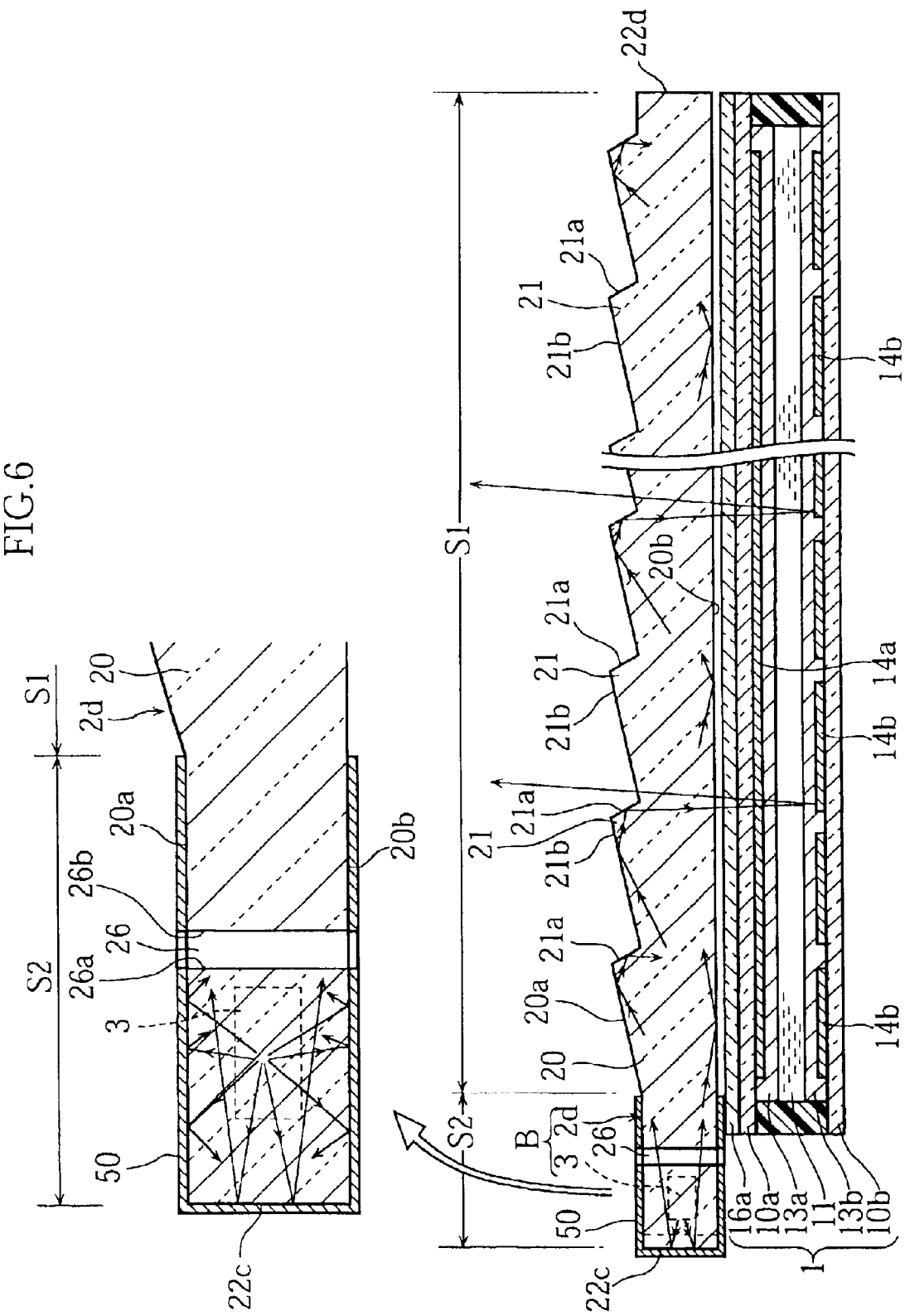
FIGS. 6 and 7 show the arrangements of a light guide according to a fourth embodiment of the present invention.
Figure 7:
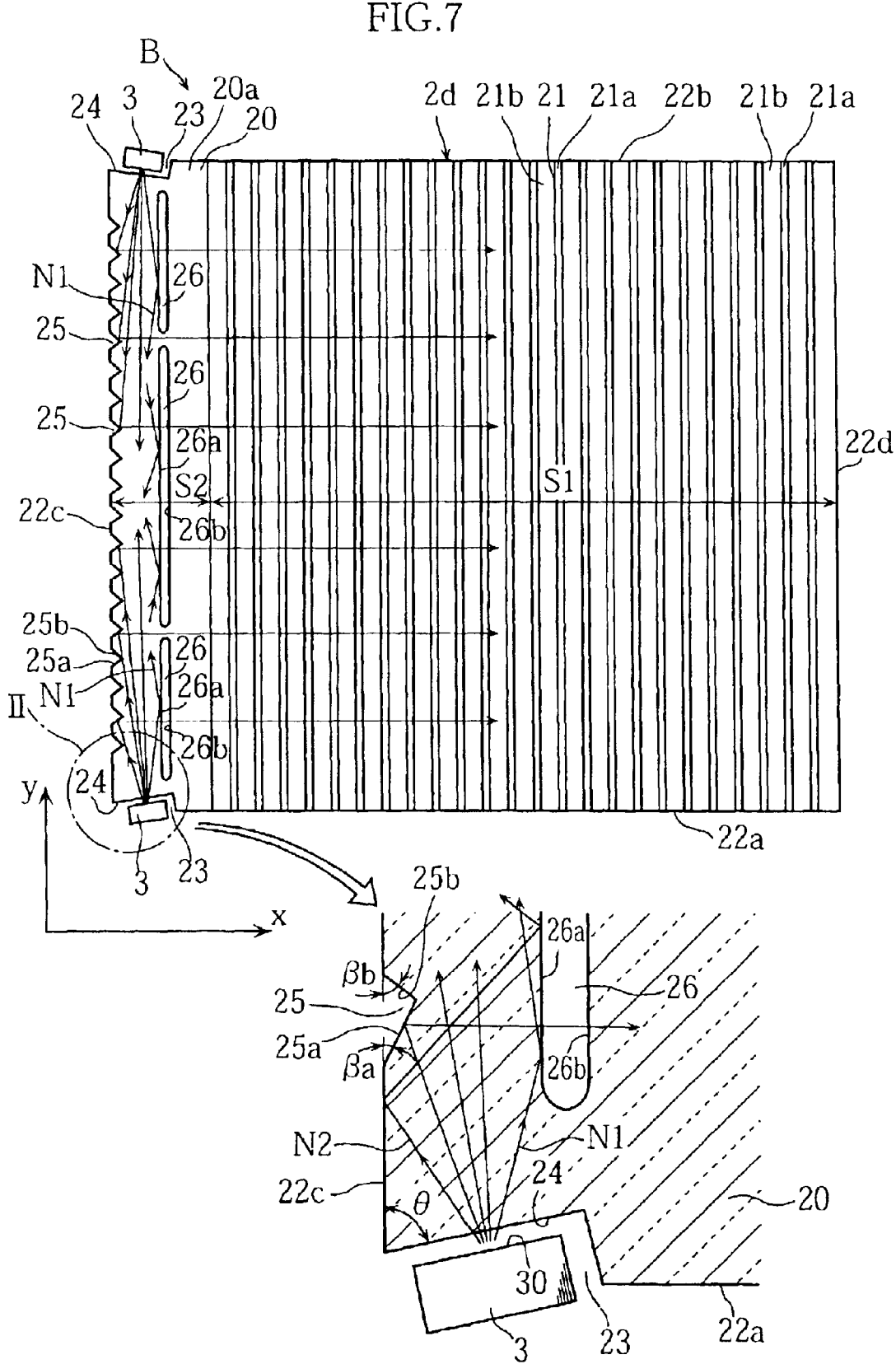

FIGS. 6 and 7 illustrate a light guide 2d according to a fourth embodiment of the present invention. The light guide 2d includes a transparent plate 20 made of synthetic resin and a light reflecting layer 50.

The transparent plate 20 comprises a light outlet region S1 for positively casting light from the rear surface 20b and a light guiding region S2 for directing light to the light outlet region S1. The light outlet region S1 is formed with a plurality of projections 21. The light guiding region S2 is the remaining region other than the light outlet region S1, including a third side surface 22c of the transparent plate 20. As in the first embodiment, each of the first and second surfaces 22a, 22b of the transparent plate 20 is formed with a cutout 23. The cutout 23 is provided with a light incidence surface 24 via which light from the light source 3 enters into the transparent plate 20.

The third side surface 22c of the transparent plate 20 is formed with a plurality of recesses 25 each having two wall surfaces 25a and 25b. As shown in FIG. 7, the wall surfaces 25a and 25b of each recess 25 are respectively inclined at appropriate angles βa and βb.

At a position appropriately spaced from the third side surface 22c in the light guiding region S2, there are provided with a plurality of slits 26 arranged in line. Each slit 26 penetrates transparent plate 20 in the thickness direction and includes a pair of inner wall surface 26a and 26b which are planes extending in the direction y and having a predetermined width in the direction of thickness of the transparent plate 20. In the illustrated embodiment, a plurality of slits (three slits) are formed with the transparent plate 20. This is one example and the present invention is not limited to this. For instance, the light guiding region S2 may be provided with only one slit formed in a relatively long shape extending in the direction y. Such slits may be replaced by a groove which does not penetrate the transparent plate 20.

As clearly shown in FIG. 6, the light reflecting layer 50 covers the front and rear surfaces and 20b of the light guiding region S2 (the light reflecting layer 50 is not shown in FIG. 7). Further, the light reflecting layer 50 covers the third side surface 22c (except the wall surfaces 25a and 25b of each recess 25). The light reflecting layer 50 is formed by vapor deposition of aluminum or application of highly reflective white coating. Instead of such a light reflecting layer 50, a metal plate prepared separately from the transparent plate 20 may be used to cover the predetermined portion of the transparent plate 20.

The liquid crystal panel 1 illustrated in FIG. 6 is the same as that illustrated in FIG. 1.

The light emitted from the light sources 3 travels in the following manner within the light guide 2d according to the fourth embodiment.

Referring to FIG. 7, the light emitted from the light sources 3 enters into the transparent plate 20 via the light incidence surfaces 24, and part of the light travels directly toward the third side surface 22c. Then, the light may meet the wall surface 25a or the wall surface 25b of the recesses 25, to be totally reflected by them toward the light outlet region S1. On the course, the light may meet the inner wall surface 26a or 26b of the slits 26. The light, traveling in the direction x, strikes upon the inner wall surface 26a, 26b at small incidence angles. Thus the light can pass through the wall surfaces 26a, 26b. This means that the slit 26 does not serve as a shield for the light traveling from the light guiding region S2 to the light outlet region S1.

Referring to the sign N1, part of the supplied light may initially travel away from the third side surface 22c. Advantageously the light can be directed toward the third side surface 22c by the inner wall surface 26a of the slit 26. Referring to the sign N2, part of the light traveling from the light incident surface 24 to the third side surface 22c may not be reflected toward the fourth side surface 22d, but be reflected toward the side surfaces 22a, 22b at angles which would enable the reflected light to go out from either one of these surfaces. However, such light can be totally reflected to the third side surface 22c by the inner wall surface 26a of the slit 26. Advantageously, reflecting light to the third side surface 22c by the inner wall surface 26a of the slit 26 reduces the amount of light leaking from the transparent plate 20 via the first side surface 22a or the second side surface 22b. The light reflected toward the third side surface 22c by the inner wall surface 26a will be totally reflected on the third side surface 22c or the other surfaces, to finally be led to the light outlet region S1.

As shown in FIG. 6, part of the light emitted from the light source 3 may travel directly or indirectly to the front surface 20a or the rear surface 22b. However, the light can be reflected back by the light reflecting layer 50. This prevents unfavorable leakage of light via the front surface 20a or the rear surface 20b in the light guiding region S2.

As shown in FIG. 6, the light traveling in the light outlet region S1 is totally reflected by the second slant surface 21b and the rear surface 20b of the transparent plate 20. Repeating the total reflection, the light travels throughout the transparent plate 20. When reflected by a first slant surface 21a of the front surface 20a, the light is directed toward the rear surface 20b, to meet the rear surface 20b at an angle smaller than the critical angle of total reflection. Consequently, the light is emitted from the rear surface 20b to illuminate the liquid crystal panel 1.

As described above, the arrangement of the fourth embodiment efficiently prevents loss of light due to leakage from the transparent plate 20. This assures a sufficient amount of light to illuminate the liquid crystal panel 1, which increases brightness of the liquid crystal display.

Figure 8:
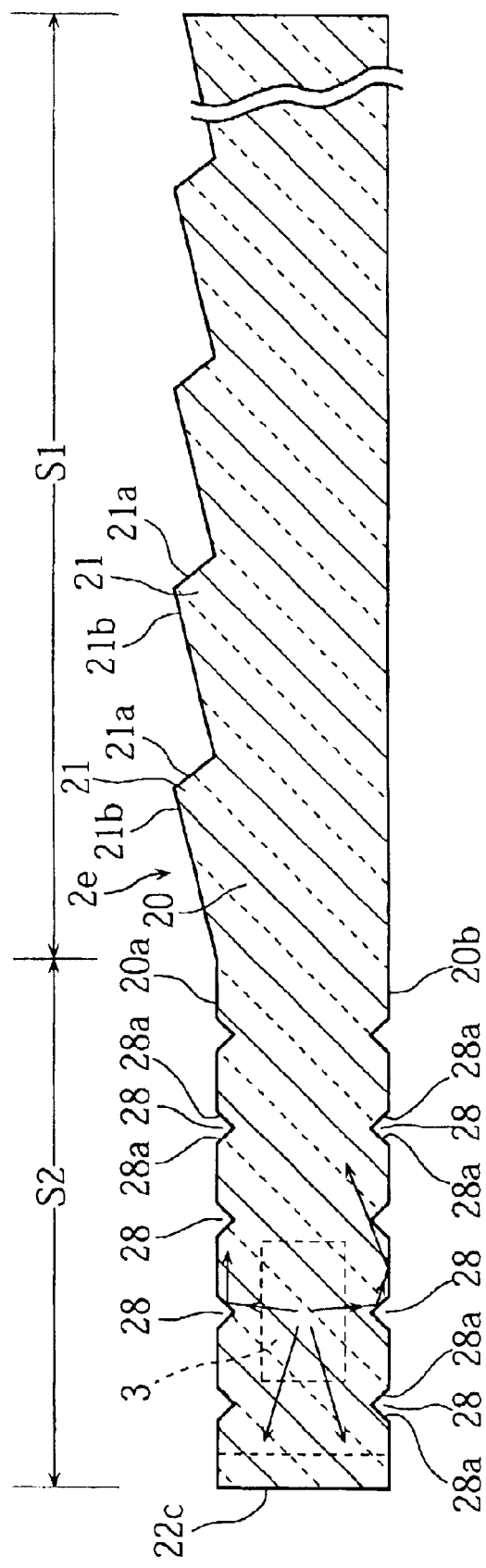
FIGS. 8 and 9 show the arrangements of a light guide according to a fifth embodiment of the present invention.
Figure 9:
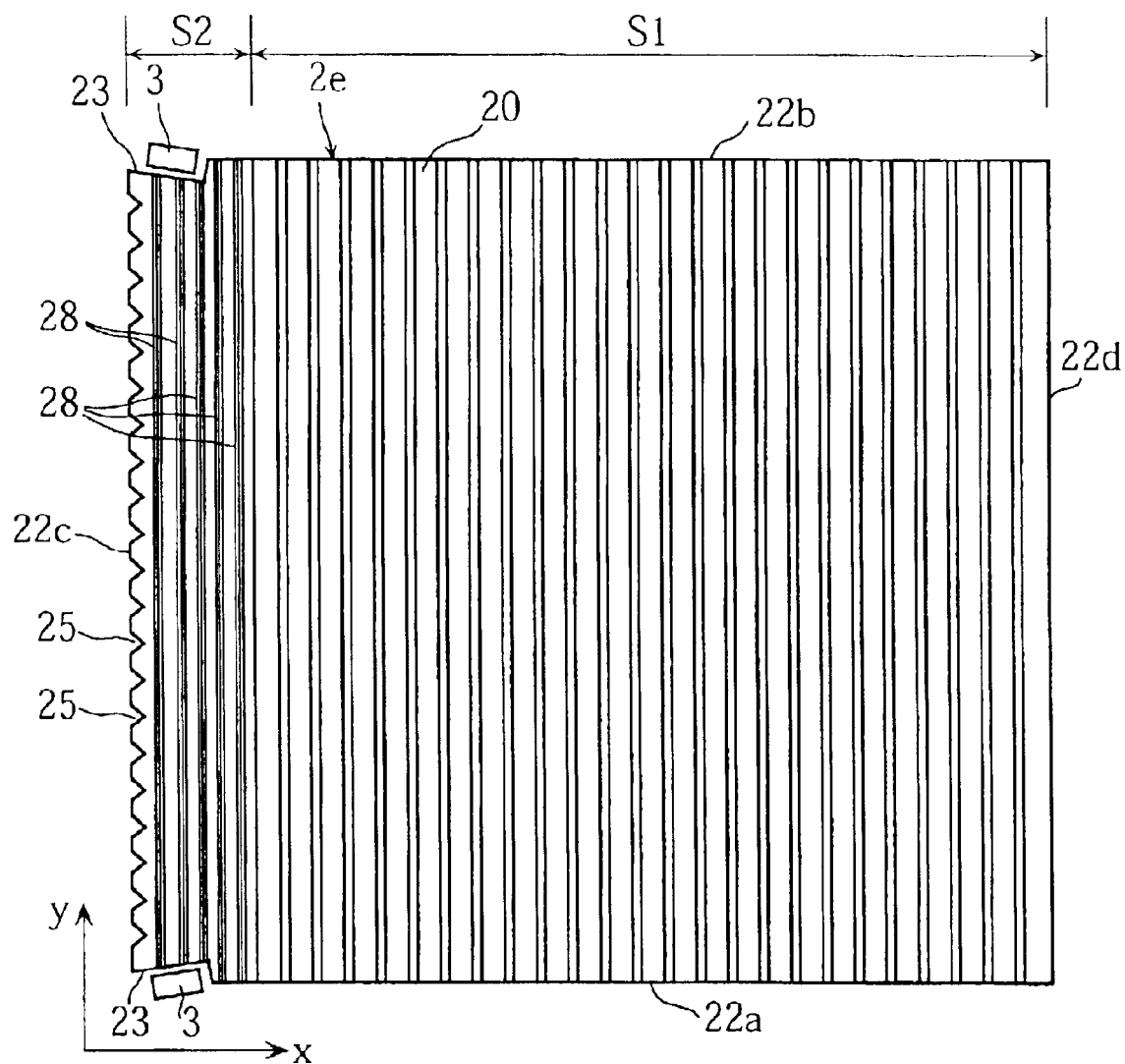

FIGS. 8 and 9 illustrate a light guide 2e according to a fifth embodiment of the present invention. The light guide 2e only comprises the transparent plate 20 having a fundamental arrangement which is the same as that according to the first embodiment. Specifically, in the fifth embodiment, the upper surface 20a of the transparent plate 20 is formed with a plurality of projections 21. Also, each of the first and second side surface 22a and 22b is formed with a cutout 23 for arranging a light source 3, and the third side surface 22c is formed with a plurality of recesses 25.

The transparent plate 20 of the fifth embodiment is different from that of the first embodiment in that the transparent plate 20 has an upper surface 20a and a bottom surface 20b which are formed with a plurality of grooves 28. Each groove 28 is defined by a pair of V-shaped wall surfaces 28a (see FIG. 8). As shown FIG. 9, the grooves 28 extend parallel to each other in the direction y and are adequately spaced apart from each other in the direction x. With this arrangement, light traveling to the front surface 20a or the rear surface 20b in the transparent plate 20 can be totally reflected by the wall surfaces 28a of the respective grooves 28. This reduces the rate of light leaking from the light guiding region S2 of the transparent plate 20.

Figure 10:
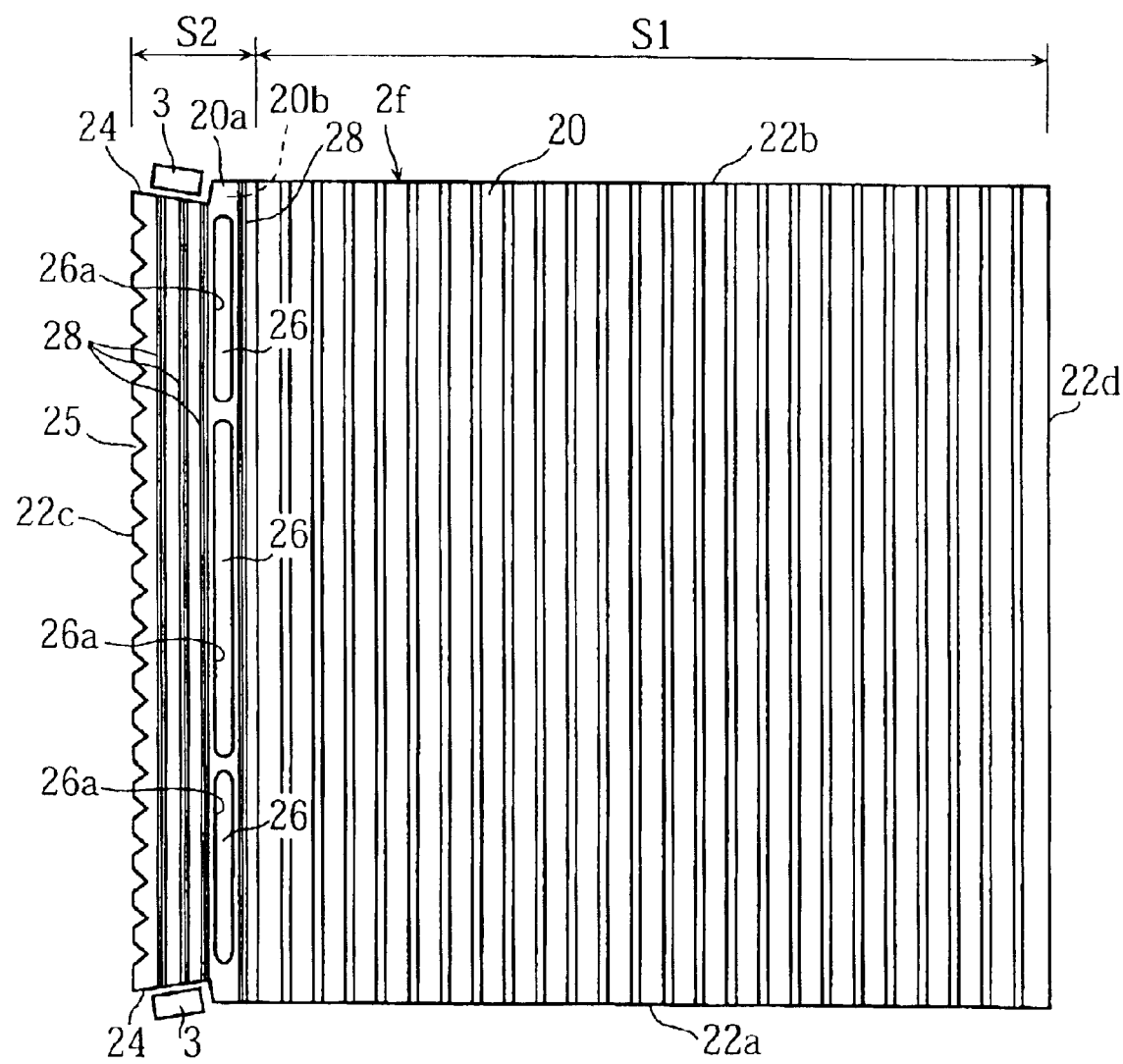
FIG. 10 shows the arrangements of a light guide according to a sixth embodiment of the present invention.

FIG. 10 illustrates a light guide 2f according to a sixth embodiment of the present invention. The light guide 2f includes the same transparent plate as that of the fifth embodiment and the plate is formed with the same slits 26 as those shown in FIG. 7. The example illustrated in FIG. 10 has three slits formed in the light guiding region S2 of the transparent plate 20. The advantages of this arrangement will be easily understood by those skilled in the art from the above explanation of the fourth and fifth embodiments.

Figure 11:
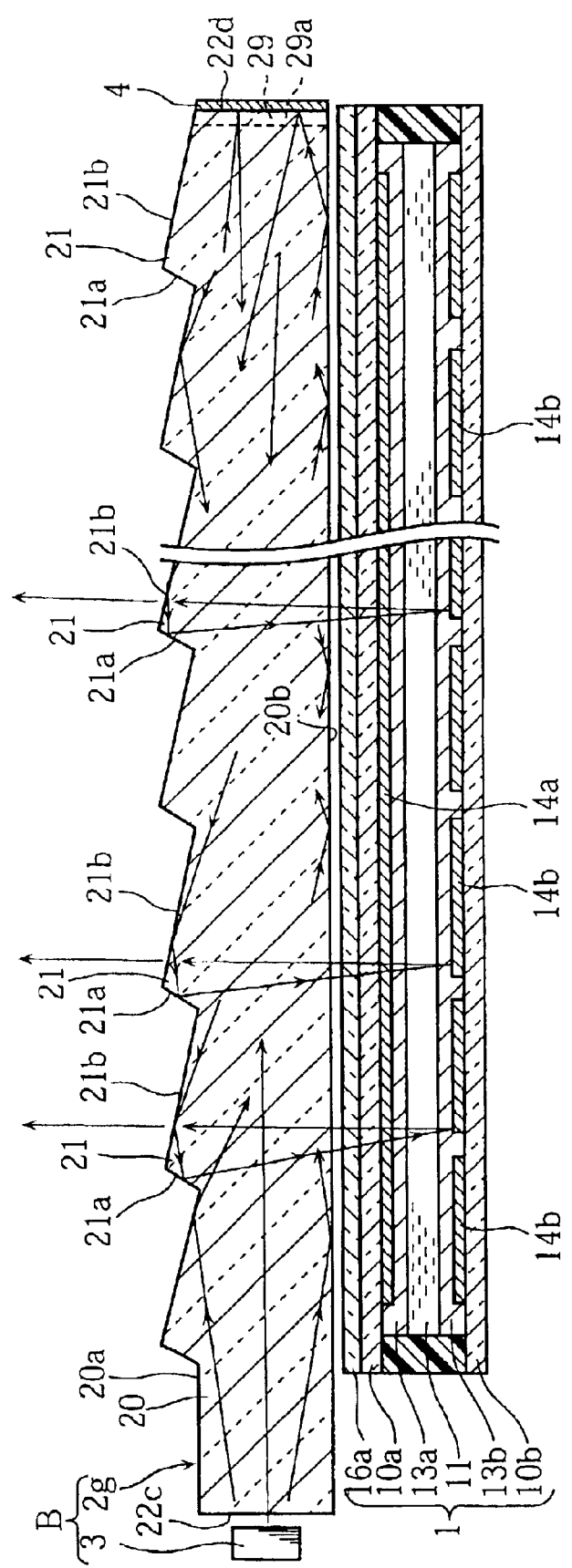
FIGS. 11 and 12 show the arrangements of a light guide according to a seventh embodiment of the present invention.
Figure 12:
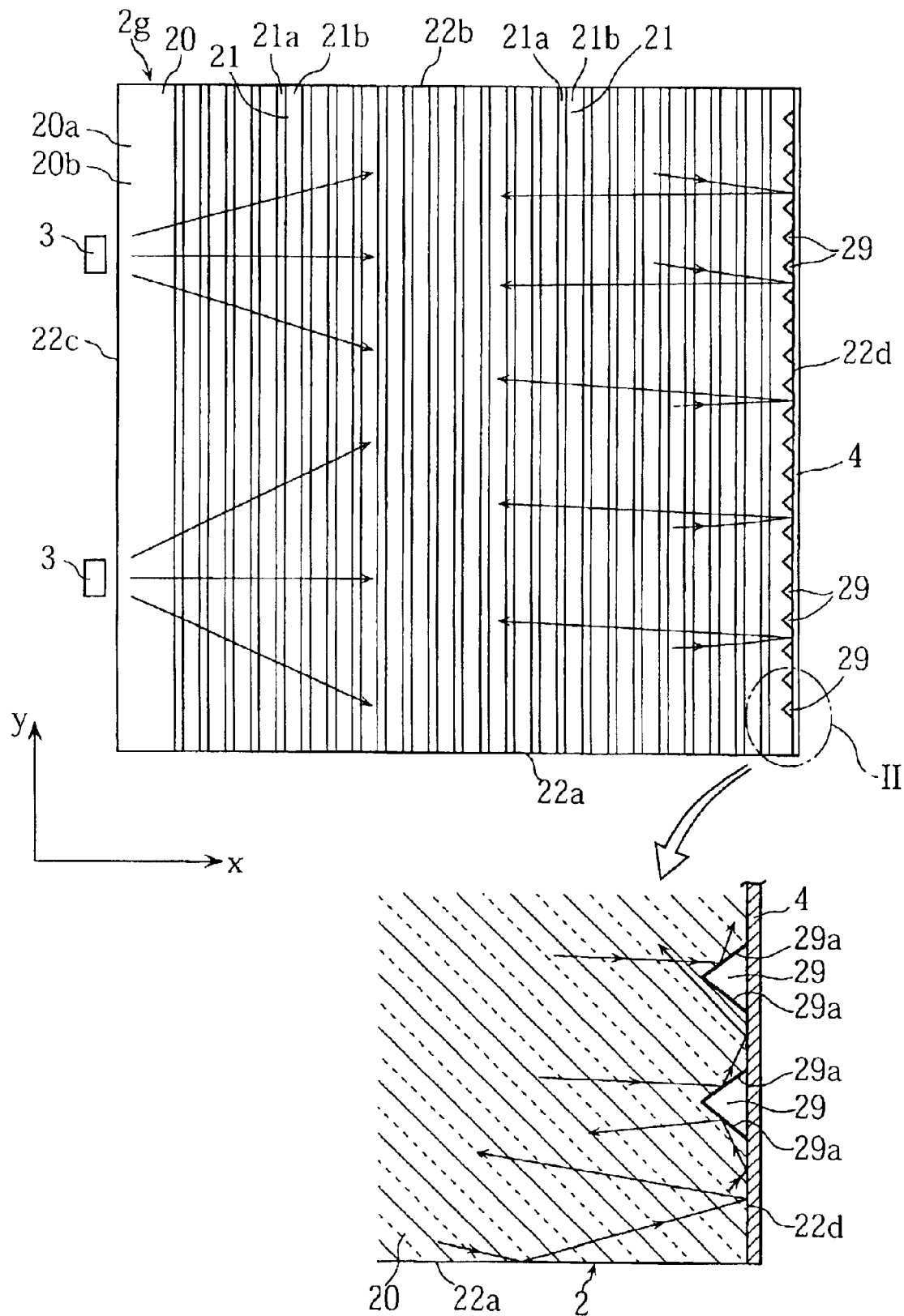

FIGS. 11 and 12 illustrate a light guide 2g according to a seventh embodiment of the present invention. The light guide 2g comprises a transparent plate 20 facing a liquid crystal panel 1. The liquid crystal panel 1 is the same as that shown in FIG. 1.

In the seventh embodiment, two point light sources 3 are arranged to face a flat third side surface 22c of the transparent plate 20. The transparent plate 20 has a fourth side surface 22d formed with a plurality of projections 29 arranged at suitable intervals in the direction y, each projection having a pair of wall surfaces 29a. For reflecting light, a tape 4 is attached to the fourth side surface 22d.

The rear surface 20b of the transparent plate 20 is flat. The front surface 20a of the transparent plate 20 is nonflat, formed with a plurality of projections 21. Each projection 21 includes first and second slant surfaces 21a, 21b which incline to the rear surface 20b. The first and second slant surfaces 21a and 21b have an arrangement opposite to that of the first through sixth embodiments described above. Specifically, the first slant surface 21a reflects light toward the rear surface 20b when the light travels from the fourth side surface 22d to the third side surface 22c. The second slant surface 21b is arranged to totally reflect light that travels from the third side surface 22c to the fourth side surface 22d and the light traveling in the opposite direction to this, so that the light does not leak via the front surface 20a. The inclination angle of the second slant surface 21b is smaller than that of the first slant surface 21a.

Light emitted from the light source 3 travels within the transparent plate 20 in the following manner.

As shown in FIG. 11, light emitted from the light source 3 enters into the transparent plate 20 via the third side surface 22c. Next, light is totally reflected a number of times by the second slant surface 21b and the rear surface 20b to travel toward the fourth side surface 22d.

Upon arriving at the fourth side surface 22d, the light is reflected by the light reflecting tape 4. This prevents the light from leaking via the fourth side surface 22d. After reflected by the tape 4, the light travels toward the third side surface 22c as it undergoes total reflection by the second slant surfaces 21b and the rear surface 20b. In this light traveling process, compared to the above-mentioned process, light is more likely to meet the first slant surfaces 21a. Upon arriving at the first slant surfaces 21a, the light may well be totally reflected so as to meet the rear surface 20b at small incident angles. Consequently, a sufficient amount of light is emitted downwardly from the rear surface 20b to illuminate the liquid crystal panel 1.

As described above, the light is not emitted from the rear surface 20b of the transparent plate 20 until it travels from the third side surface 22c to the fourth side surface 22d and then is reflected toward the third side surface 22c. In this manner, the light supplied from the light source 3 travels a long distance, whereby the variation of light distribution at the final stage (i.e., when the light is emitted from the rear surface 20b) can be made small, even if the light distribution in the direction y is fairly uneven immediately after the light is emitted from the light source 3. This effect is enhanced by the irregular reflection of the light by the reflective tape 4. Further, due to inclination, the wall surfaces 29a of the respective recesses 29 greatly change the traveling course of the light received, thereby reflecting light in various directions. This also contributes to the reduction of the variation in light distribution. When the variation of the light distribution in the direction y for the light traveling from the fourth side surface 22c toward the third side surface 22c is reduced, the light emitted from the rear surface 20b is advantageously averaged in the same direction y. As a result, the display area of the liquid crystal panel 1 is properly illuminated, which contributes to the improvement of the quality of displayed images. Further, since the reflective tape 4 prevents the leakage of light via the fourth side surface 22d, the illumination efficiency for the panel 1 can be improved to make a bright display possible.

Figure 13:
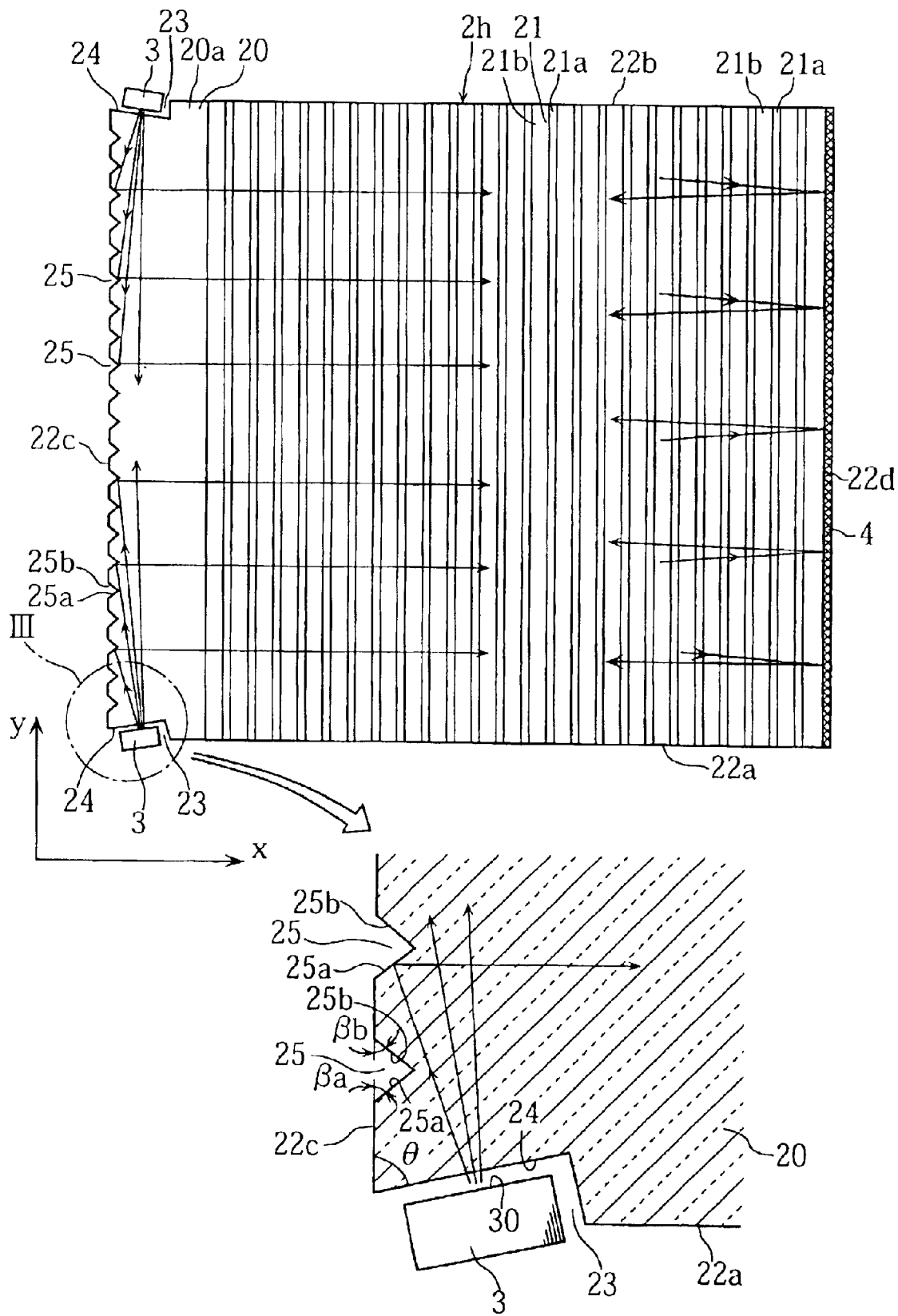
FIG. 13 shows the arrangements of a light guide according to an eighth embodiment of the present invention.
Figure 14A:
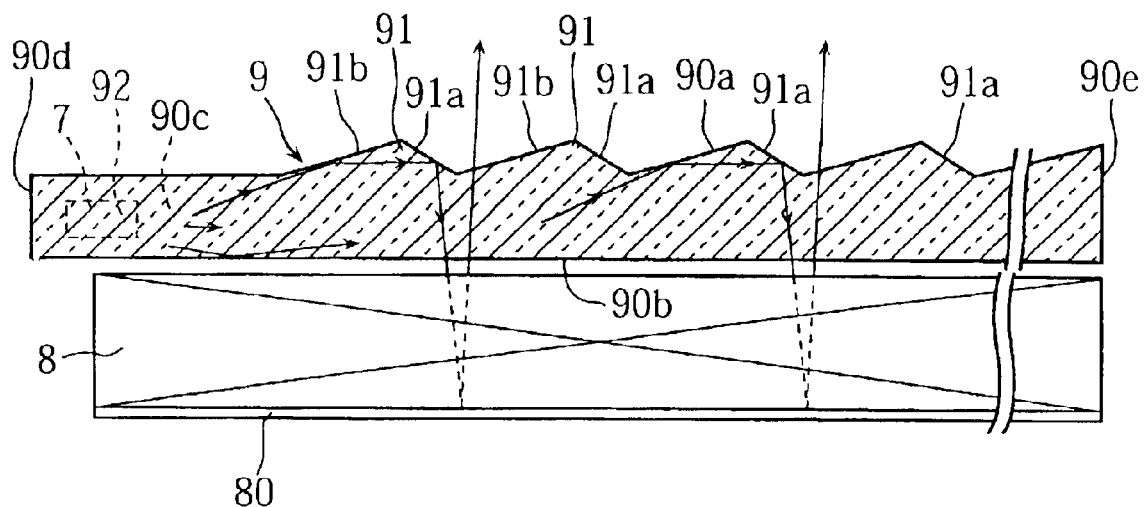
FIGS. 14A and 14B show the arrangements of a conventional light guide.
Figure 14B:
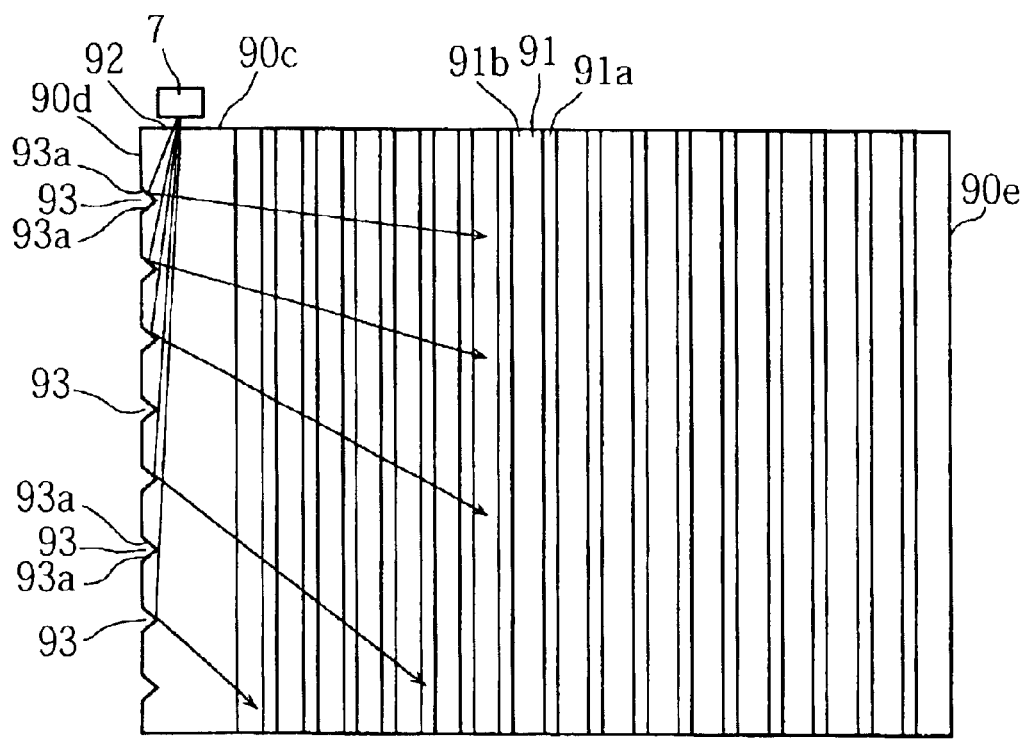

FIG. 13 illustrates a light guide 2h according to an eighth embodiment of the present invention. The light guide 2h comprises a transparent plate 20 and a light reflecting tape 4 attached to the fourth side surface 22d of the transparent plate 20. The transparent plate 20 includes first and second side surfaces 22a, 22b each having the cutout 23 for arranging a light source 3. The third side surface 22c of the transparent plate 20 is formed with a plurality of recesses 25 similar to those shown in FIG. 2. The upper surface 20a of the transparent plate 20 is formed with a plurality of projections 21 similar to those shown in FIG. 11, wherein the inclination angle of the second slant surface 21b is smaller than that of the first slant surface 21a.

With the light guide 2h, upon arriving at the fourth side surface 22d, the light is reflected by the light reflecting tape 4 to be directed toward the third side surface 22c. In this manner, the light emitted from the rear surface 20b will have even intensity on the same principle as described with reference to the seventh embodiment. According to the present invention, the light reflecting tape 4 may be replaced by a light reflector formed on the fourth side surface 22d. The light reflector may be formed by application of white coating or vapor deposition of metal such as aluminum.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. Lighting unit comprising:
   a light source having a light emitting surface; and
   a light guide that includes a first side surface having a first portion extending in a direction x and having a second portion defining a light incidence surface facing the light source, a second side surface extending in a direction y perpendicular to the direction x, a third side surface spaced from the second side surface in the direction x, and an outlet surface for exit of light;
   wherein the second side surface is formed with a plurality of recesses each including an inclined surface for causing light emitted from the light source to be reflected toward the third side surface; and wherein the first side surface is formed with a cutout for receiving the light source, the light incidence surface being provided at the cutout in facing relationship to the light emitting surface of the light source, the light incidence surface and the light emitting surface being inclined relative to the second side surface and the first portion of the first side surface.

2. The lighting unit according to claim 1, wherein the inclined surface of each recess forms an acute angle relative to the direction y, the angle increasing progressively as the recess is positioned farther from the light source.

3. The lighting unit according to claim 1, wherein the recesses increase progressively in depth as they are positioned farther from the light source.

4. The lighting unit according to claim 3, wherein the light source comprises a light-emitting diode chip.

5. A liquid crystal display comprising:

a liquid crystal panel;

a light guide facing the liquid crystal panel; and a point light source arranged adjacent to the light guide and having a light emitting surface;

wherein the light guide has a first side surface and a second side surface extending perpendicularly to the first side surface, the second side surface being formed with a plurality of wedge-shaped recesses that reflect light emitted from the light source; and wherein the first side surface includes a first portion and a second portion, the second portion being formed with a cutout for receiving the light source, the cutout providing a light incidence surface in facing relationship to the light emitting surface of the light source, the light incidence surface and the light emitting surface being inclined relative to the second side surface and the first portion of the first side surface.

6. A light guide comprising:

a front surface and a rear surface;

a first side surface which extends in a direction x and includes a first and second portion, the second portion having a light incidence surface;

a second side surface which extends in a direction y perpendicular to the direction x;

a light outlet region for exit of light traveling in the direction x through either one of the front surface and the rear surface; and a light guiding region leading light cast from the light incidence surface to the light outlet region by reflection on the second side surface;

wherein the light guiding region is formed with an elongated slit extending in the direction y; and wherein the second portion of the first side surface is formed with a cutout, the light incidence surface being provided at the cutout and inclined relative to the second side surface and the first portion of the first side surface.

7. The light guide according to claim 6, wherein the slit has a pair of mirror surfaces spaced apart from each other in the direction x.

8. The light guide according to claim 6, wherein the front surface and the rear surface are partially covered with a light reflector only at the light guiding region.

9. The light guide according to claim 6, wherein the light guiding region has a front surface and a rear surface which are formed with a plurality of wedge-shaped grooves extending in the direction y for reflecting light emitted from the light source.

10. The light guide according to claim 6, wherein the second side surface is formed with a plurality of recesses each including a light reflecting surface inclining relative to the direction y.

11. A lighting unit comprising the light guide according to claim 6 and a light source having a light emitting surface facing the light incidence surface of the light guide.

12. A light guide comprising:

a front surface and a rear surface;

a first side surface which extends in a direction x and includes a light incidence surface;

a second side surface which extends in a direction y perpendicular to the direction x;

a light outlet region for exit of light traveling in the direction x through either one of the front surface and the rear surface; and a light guiding region leading light cast from the light incidence surface to the light outlet region by reflection on the second side surface;

wherein the light guiding region is formed with an elongated slit extending in the direction y; and wherein the slit has a pair of mirror surfaces spaced apart from each other in the direction x.

13. A light guide comprising:

a front surface and a rear surface;

a first side surface which extends in a direction x and includes a light incidence surface;

a second side surface which extends in a direction y perpendicular to the direction x;

a light outlet region for exit of light traveling in the direction x through either one of the front surface and the rear surface; and a light guiding region leading light cast from the light incidence surface to the light outlet region by reflection on the second side surface;

wherein the light guiding region is formed with an elongated slit extending in the direction y; and wherein the light guiding region has a front surface and a rear surface which are formed with a plurality of wedge-shaped grooves extending in the direction y for reflecting light emitted from the light source.

* * * * *